INVENTOR.
LOUIS D. CARLO
BY
Meyer, Tilberry & Body
ATTORNEYS

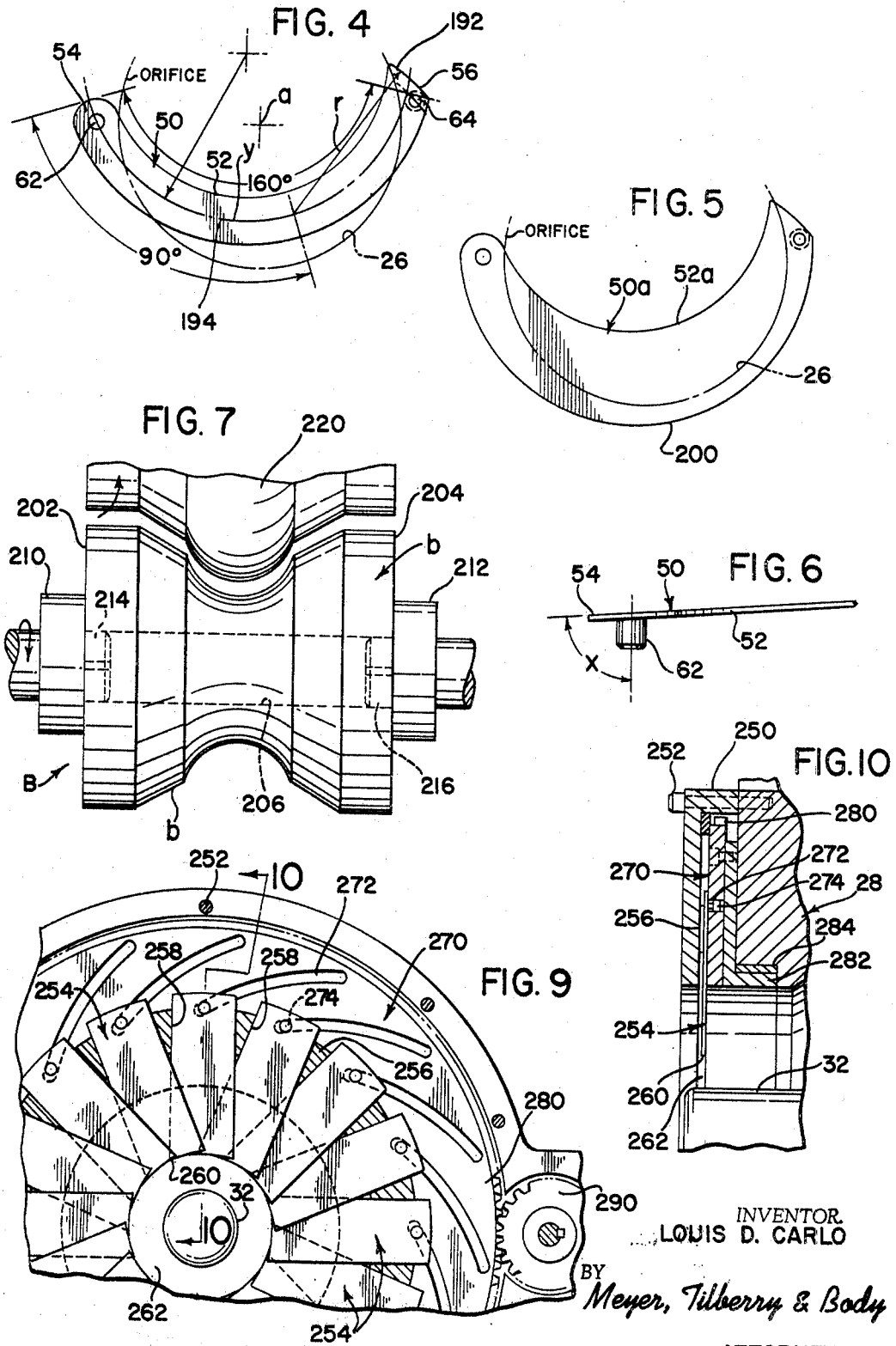

United States Patent Office 3,480,999
Patented Dec. 2, 1969

3,480,999
APPARATUS FOR MAKING FORMING ROLLS FROM A PLASTIC MATERIAL
Louis David Carlo, Cleveland, Ohio, assignor of forty-five percent to Lester A. Grove, Cleveland, Ohio, five percent to John Jose, Cleveland, Ohio, and five percent to Wayne Mettler, Berea, Ohio
Filed Oct. 21, 1965, Ser. No. 499,696
Int. Cl. B29f 3/01
U.S. Cl. 18—12                                                                 5 Claims

ABSTRACT OF THE DISCLOSURE

A manner of extruding a contoured cylindrical blank having varying diameters axially thereof includes means for selectively and automatically controlling the diameter of the extrusion orifice in accordance with a preselected pattern.

---

The present invention pertains to the art of forming rolls of the type used in tube mills, strip forming mills or rolling mills and more particularly to an apparatus for making forming rolls from a plastic material.

The invention is particularly applicable for making forming rolls and it will be described with reference thereto; however, it will be appreciated that the invention has broader applications and may be used to produce a variety of contoured cylindrical blanks or workpieces having diameters or diametric dimensions which vary in the axial direction. In other words, in a generic sense, the invention relates to the production of an object which has an outer contour defined by an indeterminate number of diameters that vary in an axial direction and have common centers.

Many metal forming operations require spaced forming rolls for changing the exterior shape of an elongated workpiece passing between the rolls. For instance, in a tube mill, a thin strip or skelp of metal is passed between a series of spaced forming rolls. These rolls bend the skelp into a tube so that it can be subsequently welded together along a longitudinal seam. In metal forming mills, a strip of metal is passed between spaced forming rolls having complementary outer contours so that the strip assumes the shape determined by the contours of the rolls. Other forming apparatus extensively used in industry also use spaced forming rolls. Consequently, because of the various uses, there is a demand for a substantial number of these contoured rolls.

Heretofore, forming rolls of the general type described above have been produced by turning the outer contour of the rolls in a lathe. In this manner, the roll was formed into a blank having an outer contour matching, but slightly larger than the desired final contour. Thereafter, the turned roll blank was finished in a grinder having a wheel with a cross-section dressed to the mirror image of the desired roll contour. This standard method for producing forming rolls had numerous disadvantages.

The turning operation required a substantial amount of skilled labor and, also, wasted a great portion of the metal from which the roll was being formed. The subsequent grinding operation was, therefore, performed on an expensive blank. For this reason, it was necessary to grind the outer surface of the forming roll blank with great care. This increased the grinding time and the cost of the grinding operation. The summation of the costs involved in performing these various precision machining operations made the forming rolls relatively expensive.

These disadvantages and other disadvantages of prior methods for producing forming rolls are overcome by the present invention which is directed toward an apparatus for forming cylindrical blanks which can be used as forming rolls.

In accordance with one aspect of the present invention, there is provided an apparatus for forming a contoured cylindrical blank having diameters which vary in the axial direction. This apparatus comprises an extruder having a ram and an outlet orifice with axial movement of the ram causing extrusion of a formable material through the orifice to form a blank, means for controlling the diameter of the extruded blank, this means being positioned at the orifice and including a shutter having a generally circular opening perpendicular to the feedline, and means for changing the diameter of the opening in a preselected pattern as the material is forced through the shutter opening.

In this manner, a blank may be formed which has an outer contour generally matching the finished or final contour for a forming roll. By using a mixture of a curable plastic material, such an an epoxy resin, and finely divided particles of steel as the formable material being extruded through the orifice, the resulting extruded blank may be used as the blank which is finish ground into a forming roll. This arrangement has proven quite satisfactory in practice. The life of a forming roll formed in this manner, although often not as great as the life of a solid steel forming roll, does present a substantial savings because of drastic reduction in the cost of manufacturing the roll.

In accordance with another aspect of the present invention, there is provided a forming roll comprising a body formed from a mixture of curable plastic material and finely divided metal particles.

The primary object of the present invention is the provision of an apparatus for forming a blank which may be finish machined into a forming roll which apparatus allows production of a forming roll blank having a substantially reduced cost.

Another object of the present invention is the provision of an apparatus for forming a blank which may be finish machined into a forming roll which apparatus produces a blank having substantially the desired final contour without extensive rough machining.

Still another object of the present invention is the provision of an apparatus for forming a blank which may be finish machined into a forming roll which apparatus produces a blank formed from a mixture of a curable plastic and finely divided metal particles.

Yet another object of the present invention is the provision of an inexpensive forming roll which is durable in use.

Another object of the present invention is the provision of a forming roll which is formed from a mixture of a plastic material and finely divided metal particles.

These and other objects and advantages will become apparent from the following description used to illustrate the preferred embodiments of the invention as read in connection with the accompanying drawings in which:

FIGURE 4 is a top plan view of an element used in the embodiment of the invention shown in FIGURES 1–3;

FIGURE 5 is a top plan view illustrating a modification of the element shown in FIGURE 4;

FIGURE 6 is a partial side view of the element shown in FIGURE 4;

FIGURE 7 is a partial front elevational view illustrating, somewhat schematically, a subsequent processing step of the present invention;

FIGURE 8 is a reduced, schematic view illustrating a further modification of the embodiment shown in FIGURES 1-3;

FIGURE 9 is a partial, bottom plan view illustrating a further modification of the preferred embodiment of the invention shown in FIGURES 1-3; and, FIGURE 10 is a partial, cross-sectional view taken generally along line 10—10 of FIGURE 9.

Figure 1:
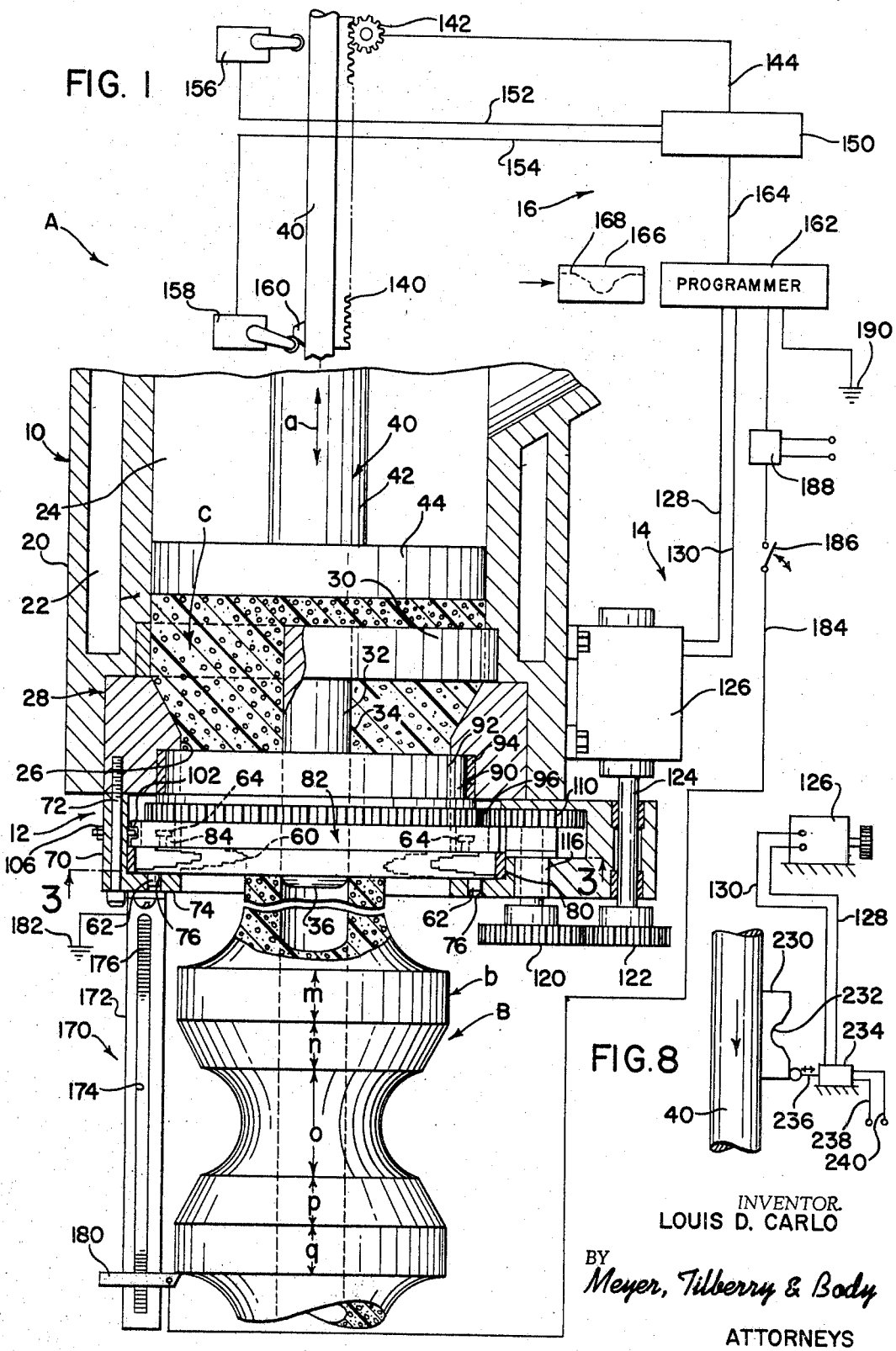
FIGURE 1 is a cross-sectioned, side elevational view showing, somewhat schematically, the preferred embodiment of the present invention.
Figure 2:
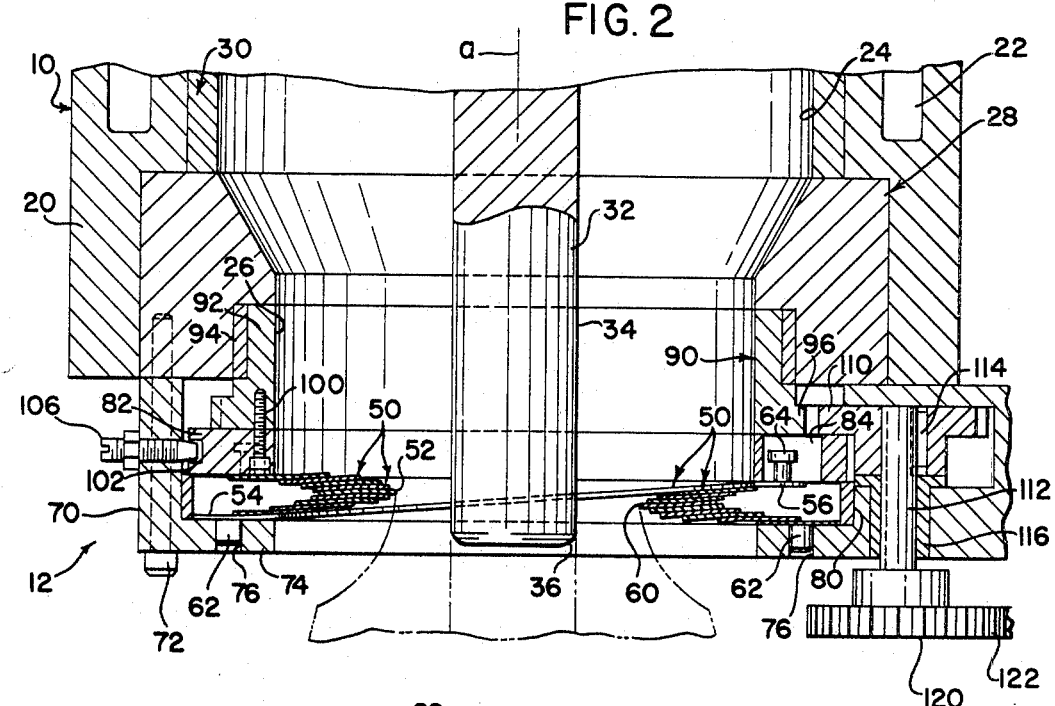
FIGURE 2 is an enlarged view showing, in more detail, certain aspects of the embodiment shown in FIGURE 1.
Figure 3:
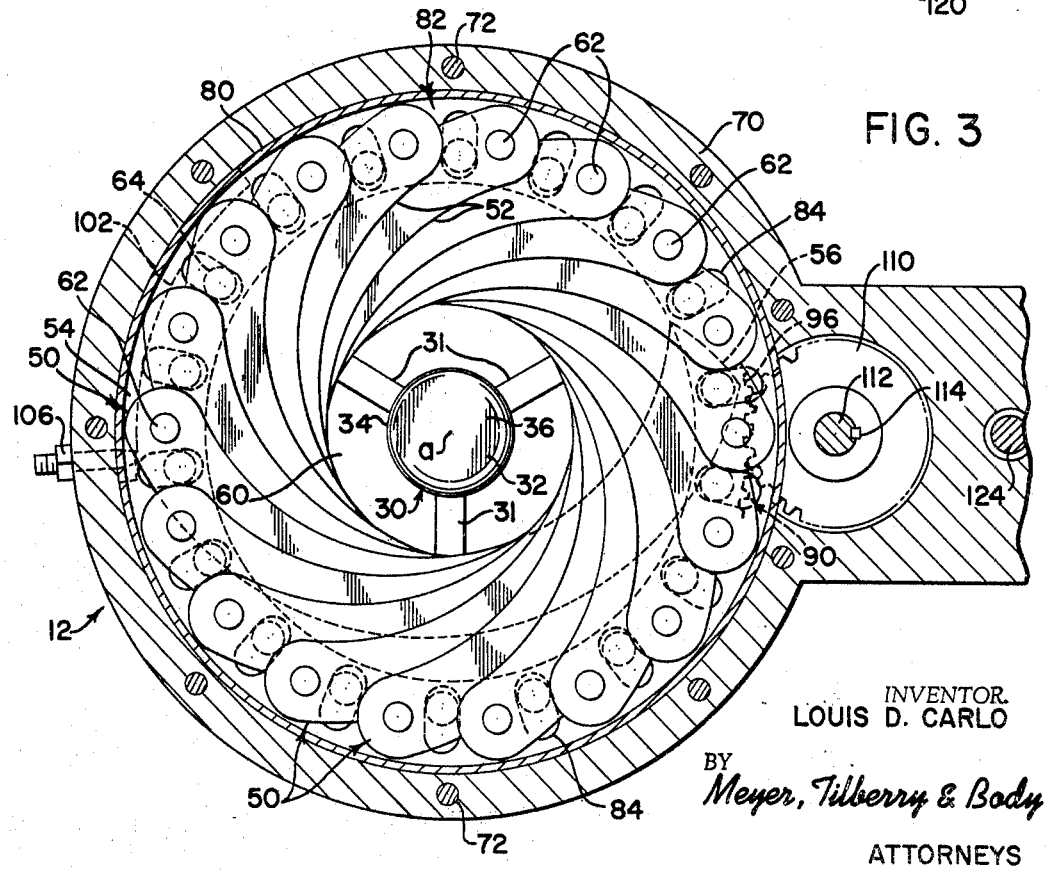
FIGURE 3 is an enlarged cross-sectional view taken generally along line 3—3 of FIGURE 1.

Referring now to the drawings wherein the showings are for the purpose of illustrating preferred embodiments of the invention only and not for the purpose of limiting same, FIGURES 1-3 show an apparatus A for forming a blank B by extruding the blank along a feedline $a$. In accordance with the invention, the blank B, which is well adapted for subsequent use as a forming roll, has an outer contour $b$ with the external diameters varying in an axial direction. For instance, the sections $m$, $q$, are cylindrical in shape with uniform diameters, sections $n$, $p$, are frusto-conical in shape with diameters varying lineally along the axis of the blank, and section 0 is semi-circular in cross-section with the diameters decreasing and then increasing. It will be appreciated that a variety of other shapes can be produced by apparatus A without departing from the intended spirit and scope of the present invention. Apparatus A includes, as basic elements, extrusion head 10, diameter changing mechanism 12, device 14 for controlling the mechanism 12, and a programming device 16 for monitoring the control device 14.

Referring now more particularly to the extrusion head 10, this head includes a casing 20 having annular heating chambers 22, an inner bore 24 and an orifice 26 formed within a ring 28. Within bore 24 there is provided a spider 30 having radially extending support legs 31 and an axially extending plug 32 which includes an outer surface 34 and a rounded nose 36. Movable within bore 24 is a ram 40 including an operating rod 42 and a piston 44. A formable material C is charged into bore 24 below the piston 44 so that downward movement of the piston by rod 42 extrudes material C through orifice 26 and through diameter changing mechanism 12.

The material C may be any of numerous materials which are susceptible to forming by extrusion. Generally, this material will be a plastic material that is either hardened by cooling or hardened by a chemical process. The material must have a consistency so that it will hold the shape into which it is extruded. There are a number of materials which have these characteristics; therefore, a person with ordinary skill in the art of extruding plastics would have little difficulty in selecting a proper, operative material.

In accordance with a preferred embodiment of the invention, the blank B is subsequently used as a forming roll. For this particular purpose, and in accordance with the invention, the material C includes a mixture of a plastic and finely divided metal particles. Preferably, the plastic is an epoxy resin which is mixed with proper chemicals to allow hardening or curing of the resin after it passes through apparatus A. The epoxy resin is filled with finely divided particles of steel so that the epoxy substantially wets all surfaces of the steel particles and bonds the particles in fixed relationship with respect to each other. Although a variety of grain sizes for the steel particles may be used without departing from the invention, it has been found that a grain size within the range of 10 microns to .050 inch produces a rigid blank which, when ground to the final shape, can be used as a forming roll having wear characteristics quite similar to solid steel rolls. In practice the steel particles have a grain size similar to talcum powder.

The amount of steel particles within the plastic may be adjusted; however, the steel particles must be proportioned with respect to the epoxy resin or plastic so that they will be completely wetted and held together by the plastic. As the grain size of the metal particles approaches the lower limit, there is a substantial difficulty in obtaining proper mixing; however, proper mixing is not an impossibility. In fact, mixing of material including ultra-fine particles can be accomplished by prolonged mixing in various laboratory or industrial mixers, and the resulting blank will have superior strength characteristics. It is appreciated that the partcular use to which the blank B will be subjected will dictate the plastic material to be used and the grain size of the particles.

Diameter changing mechanism 12, as is best shown in FIGURE 2, includes a plurality of individual elements 50 (see FIGURE 4) which are formed from sheet metal and are somewhat flexible in a direction perpendicular to their flat surfaces. These elements have radially innermost edges 52 which are arcuate in shape and extend between terminal ends 54, 56. The elements 50 coact to provide a shutter having a central opening 60 (see FIGURES 2 and 3) which is adjustable to produce a variety of diameters. Each element 50 includes a fixed pivot pin 62 adjacent the terminal end 54 and a cam pin 64 adjacent terminal end 56. Pin 62 is best shown in FIGURES 2 and 6. The angle $x$ between the element and the pin 62 allows the pin to remain substantially vertical, while the element itself is canted. By canting the elements, each element may lie over a number of other elements to provide the shutter mechanism shown in FIGURE 3. The diameter of opening 60 is changed by moving elements 50, in unison, so that the innermost edges 52 move radially to change the diameter of the opening.

A variety of mechanisms and mechanical connections could be used for moving elements 50, in unison, to change the diameter of opening 60; however, in accordance with the preferred embodiment of the present invention, there is provided a housing 70 bolted onto ring 28 by a plurality of spaced bolts 72. Housing 70 includes an inwardly extending flange 74 having circumferentially spaced apertures 76. These apertures receive the downwardly extending, angularly disposed pins 62 so that these pins will pivot around a fixed axis. A spacer ring 80 supports a cam plate 82 having a plurality of radially extending cam slots 84 to receive cam pins 64 of the shutter elements 50. Rotation of cam plate 82 moves the innermost edges 52 inwardly and outwardly to adjust the radius of opening 60.

To rotate cam plate 82, there is provided a drive gear unit 90 including a hub 92 journalled within ring 28 by bearing 94. The drive unit includes a gear 96 which, when rotated, moves the plate 82 by attaching bolts 100. To limit the rotary movement of plate 82, the plate is provided with an outwardly extending, arcuate slot 102 which receives a stop 106. The arcuate length of slot 102 determines the limits of angular movement for plate 82. As the elements 50 are shifted, the pins 64 slide within radial slots 84, in a manner illustrated in FIGURE 3.

Referring now to the control mechanism 14, this mechanism includes a gear 110 drivingly connected with gear 96 and rotated by a shaft 112 through a key 114. The shaft is journalled within housing 70 and includes a lower gear 120. A driving gear 122 is secured onto the end of shaft 124 and is driven by a motor 126 mounted onto casing 20. Input lines 128, 130 control the angular movement of the motor shaft 124. The motor shaft will rotate in one direction or another in accordance with the polarity of the voltage across lines 128, 130, and it will move angularly a distance determined by the duration and/or level of the voltage. It is appreciated that a variety of other arrangements could be utilized for rotating the cam plate 82 and, thus, changing the diameter of the center opening 60.

In accordance with the illustrated embodiment of the invention, the motor 126 is controlled by a programming device 16 including a rack 140 which is secured onto ram 40. A pinion 142 is driven by the rack as ram 40 moves in an axial direction to extrude material through orifice 26. Essentially, the pinion 142 senses the amount of movement of the ram which movement is directly correlated to the amount of material being extruded through the orifice 26 and the axial length of the extrusion. A control line 144 is connected with a sensing mechanism 150 so that the axial movement of the ram is communicated to the sensing mechanism. Mechanism 150 is selectively turned on and off by a signal in lines 152, 154 which lines are connected onto limit switches 156, 158, respectively.

A cam 160 is secured onto ram 40 so that movement of the ram downwardly will first turn on sensing mechanism 150 by contacting limit switch 156 and then turn off the sensing mechanism by contacting the limit switch 158. Thus, the limit switches 156, 158 control the operating duration of programming device 16, and the pinion 142 controls the sensing mechanism 150 to inform the programming device on the axial length of the extrusion. A programmer 162 is driven by the sensing mechanism 150 through line 164 which imposes a signal on the programmer in accordance with the axial length of the material being extruded. Programmer 162 is programmed by an insertable card 166 having an indicia or code 168 provided thereon. This card is inserted into the programmer so that the programmer will control motor 126 in accordance with the signal from the sensor 150 to produce the desired outer contour b on the blank B. It should be appreciated that the programmer may be controlled by a tape, punch card, disk or any other control device common in the art of machine controls.

Referring again to FIGURE 1, there is provided an auxiliary mechanism 170 to sense the axial length of the blank B. This mechanism includes a frame 172 mounted substantially parallel with the feedline a and having a slot 174 with an elongated rheostat 176 positioned therebehind. A movable slide 180 includes a contact (not shown) movable along the rheostat to change the effective resistance of the rheostat as the length of the blank B increases. A ground 182 is secured at the upper portion of the rheostat 176 while the slide 180 is electrically connected onto a line 184 extending to the programmer 162. A switch 186 selectively connects the line 184 with a voltage supply 188 so that the voltage supply is in series with the rheostat 176. A ground 190 completes the electrical circuit through the programmer 162. As the axial length of the blank B increases, the current flow within the line 184 decreases. This is sensed in the programmer to control the rate of movement of motor 126 in accordance with the program set by card 166. This auxiliary arrangement does away with the need for pinion 142; however, switches 156, 158 are still used to activate and deactivate the programmer 162. It is appreciated that other mechanisms could be provided for sensing the length of the blank to correlate changes in diameter to the axial position of the blank being extruded.

Referring to FIGURE 4, element 50 includes a nose 192 on end 56. This nose is defined by a radius r which has a length that makes the length of edge 52 approximately 160° and which has a center on an arc 194 concentric with edge 52 and through the fixed pivot axis of pin 62. This center is spaced 90° from the fixed axis so that the nose has proper clearance when moving with respect to the other elements.

In FIGURE 5, a modification of the elements 50 is illustrated. This modification includes an increased body width defined by an expanded outermost edge 200. Edge 52a remains substantially the same as edge 52. The increased width of the element substantially enhances its rigidity while not affecting the function of the element in developing the shutter opening 60.

After the blank B has been cured by cooling or by hardening in another manner, the blank is cropped to form square edges 202, 204. See FIGURE 7. The blank includes a central bore 206 formed by plug 32 during the extruding operation. The hardened or cured blank B is positioned between supports 210, 212 and expandable mandrels 214, 216 engage the bore 206 to secure the blank with respect to the supports. A grinding wheel 220 having an outer contour matching the desired finished contour of the forming roll is then brought into contact with the outer contour b of the blank and grinds a final, finished surface on the blank. Thereafter, the blank may be used as a forming roll. It has been found that this type of forming roll has a substantial life and is relatively inexpensive to produce when compared with the prior method of first turning the blank and then finish grinding the same.

Referring now to FIGURE 8, a modification of the preferred embodiment of the invention shown in FIGURES 1–6 is illustrated. In this embodiment, the ram 40 is provided with a removable cam 230 having an outwardly extending cam surface 232 which generally matches the desired final contour for blank B. A senser 234 having a cam follower 236 and power leads 238, 240 is positioned adjacent the surface 232 so that movement of the ram will reciprocate follower 236 and cause the motor 126 to rotate in the proper direction and the proper amount to control plate 82. This is only one of many other arrangements which could be utilized for controlling the diameter changing mechanism 12.

In fact, the diameter changing mechanism may be modified without departing from the invention. Such a modification is illustrated in FIGURES 9 and 10. A housing 250 is secured by bolts 252 onto ring 28. A plurality of generally rectangular blades 254 are slidably received within a stationary guide plate 256 having blade receiving slots 258. The blades are movable only in a radial direction in the slots 258, and each blade includes a radial innermost edge 260. These edges coact to form a shutter mechanism having an opening 262. Each edge is generally straight and normal to the axial direction in which the blade moves. A cam plate 270 is rotatably mounted within the housing and includes a plurality of circumferentially spaced arcuate slots 272 which receive cam pins 274 secured to the outermost ends of the individual blades. A gear 280 is secured onto the cam plate and includes a hub 282 journalled within ring 28 by a bearing 284. A control drive gear 290 rotates the cam plate 270 to move the individual blades 254 radially. This changes the diameter of the opening 262 and controls the diameter of the blank being extruded through the apparatus. It is appreciated that other such modifications could be made in the diameter changing mechanism without departing from the intended scope of the present invention. For instance, the individual blades could be electro-magnetically or hydraulically operated without involving more than ordinary skill of a person in the art of extruding. In some instances, the individual blades may be controlled independently to generate a variety of other shapes; however, in accordance with the preferred embodiment of the invention, the blades are controlled in unison to generate a shape having changing outer diameters.

The present invention has been described in connection with certain structural embodiments; however, changes may be made in these embodiments without departing from the spirit and scope of the invention as defined in the appended claims.

Having thus described my invention, I claim:

1. An apparatus for forming a contoured cylindrical blank having diameters which vary in the axial direction, said apparatus comprising: an extruder for forcing a formable material through an orifice on a given feedline; means for controlling the diameter of said blank, said means being positioned at said orifice and on said feedline; said diameter control means including a shutter having a generally circular opening generally perpendicular to said feedline whereby said material is forced therethrough and means for changing the diameter of said shutter opening as said material passes through said opening to change the external diameter of said extruded material, remote means for controlling said diameter changing means in accordance with a preselected pattern whereby said material has a contoured outer surface with diameters varied in an axial direction, said shutter being formed from a plurality of elements which have radially innermost portions, said innermost portions defining said shutter opening, said diameter controlling means is a mechanism for radially shifting said innermost portions of said elements in unison to change the diameter of said opening, said elements being blades and said innermost portions being edges of said blades, said shifting mechanism including a mechanical connection for moving said blades in unison to shift said edges radially with respect to said feedline, said edges being arcuate in shape with said arc of each blade extending between terminal ends of said blades and generally within a plane perpendicular to said feedline, one terminal end of each blade being connected onto said diameter control means to pivot around an axis generally parallel with said feedline, and said mechanical connection being a plate with a plurality of cam slots, said other ends of said blades being slidably received in said slots, means for rotating said plate about an axis coinciding with the center of said shutter opening whereby rotation of said plate shifts said edges radially with respect to said feedline, and said remote means including a motor means for rotating said plate.

2. An apparatus for forming a contoured cylindrical blank having diameters which vary in the axial direction, said apparatus comprising: an extruder for forcing a formable material through an orifice on a given feedline; means for controlling the diameter of said blank, said means being positioned at said orifice and on said feedline; said diameter control means including a shutter having a generally circular opening generally perpendicular to said feedline whereby said material is forced therethrough and means for changing the diameter of said shutter opening as said material passes through said opening to change the external diameter of said extruded material, remote means for controlling said diameter changing means in accordance with a preselected pattern whereby said material has a contoured outer surface with diameters varied in an axial direction, said remote means including a means for sensing the axial length of said material being extruded and program means for changing said opening diameter in a preselected pattern and in accordance with said sensed length.

3. An apparatus as defined in claim 2 wherein said extruder includes a ram, said sensing means being driven by said ram with the axial position of said ram being sensed as the axial length of said material being extruded.

4. An apparatus as defined in claim 1 wherein said arc is more than 90° in length.

5. An apparatus as defined in claim 1 wherein said other terminal end is arcuate in shape and defines an arcuate edge with the center of said arc being located on an arcuate line concentric with said arcuate edge and passing through said fixed axis and spaced from said fixed axis by approximately 90°.

References Cited

UNITED STATES PATENTS

| 1,922,770 | 8/1933 | Kornbrath | 72—468 |
| 2,260,479 | 10/1941 | Picking | 72—468 XR |
| 2,578,229 | 12/1951 | Clement et al. | 72—468 |
| 3,080,607 | 3/1963 | Bley | 18—8 |
| 3,124,839 | 3/1964 | Adams. | |
| 3,246,629 | 4/1966 | Shelffo et al. | 29—132 XR |
| 2,793,598 | 5/1957 | Rivoche. | |
| 2,044,961 | 6/1936 | Waner | 18—14 |
| 3,134,832 | 5/1964 | Smith. | |
| 3,186,032 | 6/1965 | Harwood | 18—14 |
| 3,217,360 | 11/1965 | Mason et al. | 18—14 |
| 3,327,350 | 6/1967 | Limbach | 18—14 |
| 2,936,483 | 5/1960 | Deakin. | |

FOREIGN PATENTS

| 949,344 | 2/1964 | Great Britain. |

WILLIAM J. STEPHENSON, Primary Examiner

U.S. Cl. X.R.

18—14